United States Patent

Edwin et al.

[15] 3,694,637
[45] Sept. 26, 1972

[54] METHOD AND APPARATUS FOR DETECTING TOOL WEAR

[72] Inventors: Allan I. Edwin; Thomas L. Vlach, both of Ann Arbor, Mich.

[73] Assignee: Interactive Systems, Inc., Ann Arbor, Mich.

[22] Filed: Oct. 22, 1970

[21] Appl. No.: 83,173

[52] U.S. Cl. .................235/151.3, 73/104, 73/71.4, 73/67
[51] Int. Cl. ............................................G01n 19/02
[58] Field of Search........73/104, 105, 67.2, 67, 71.4; 340/267 R; 235/151.3

[56] References Cited

UNITED STATES PATENTS 3,548,648  12/1970  Weichbrodt et al. .........73/104
2,978,689  4/1961   Tech et al. ..............340/267 R
3,531,983  10/1970  Heath et al. ................73/76.2
3,550,107  12/1970  Thompson et al. ....340/267 R

*Primary Examiner*—Eugene G. Botz
*Attorney*—McGlynn, Reising, Milton & Ethington

[57] ABSTRACT

A method and apparatus for monitoring tool wear as a function of change in a power-frequency distribution obtained by Fourier analysis of a vibrational characteristic of the tool during use. Optimum tool change time is indicated by comparing a selected power spectrum or a selected portion thereof to a reference spectrum obtained from a test tool. A small general-purpose digital computer is employed in the analysis phase. A specially designed detector circuit for actual tool monitoring is also disclosed.

4 Claims, 4 Drawing Figures

INVENTORS
Allan I. Edwin, &
BY Thomas L. Vlach

Barnard, McGlynn & Reising
ATTORNEYS

METHOD AND APPARATUS FOR DETECTING TOOL WEAR

This invention relates to a method and apparatus for detecting tool wear by monitoring a vibrational characteristic of a tool while in use and comparing that characteristic to a preestablished standard.

It is well known that a machine tool such as a drill or cutter produces a different use characteristics and surface finish results as it wears from a new or sharpened condition to a worn and dull condition. It is desirable from several standpoints to replace a tool at some optimum point in the use term thereof; for example, overly extended use of the tool may produce an excessive amount of unsatisfactory work and it may ruin the tool beyond repair whereas changing the tool too often obviously results in excessive down time and lost production.

One way to determine the wear characteristics of a tool is to periodically examine the surface finish of the workpiece which is produced using the tool. This is a fairly detailed analysis and it is often impractical to make such an analysis on a rapid enough basis to acurately determine the optimum replacement point for the tool. Another prior art approach to monitoring tool wear is to detect the reaction force or pressure which is exerted by the tool on a mechanical transducer during use, the theory being that the reaction force becomes greater as the tool becomes dull. This approach requires the modification of the machine tool to accept a pressure transducer, such modification often being costly and impractical depending upon the design of the particular tool.

As a result of the general impracticality of these prior art tool wear monitoring methods, it would seem that the most popular method of determining the point at which a tool should be changed is simply to rely upon the judgment of an experienced operator. Here again the usual human error factor renders this approach highly nonuniform if not comparatively unreliable.

In accordance with the present invention, tool wear is uniformly and reliably monitored to determine the estimated wear of a tool in use, thus, to accurately estimate the optimum point for replacing that tool. In the most general sense, the subject invention comprises monitoring the vibrational characteristic of the tool while in use and comparing one or more predetermined factors in the power-frequency distribution of the vibration characteristics to a preestablished model or standard which has been correlated with actual wear.

According to a more specific aspect of the invention, a power spectrum of the vibrational characteristic of a machine tool is generated such as by Fourier analysis of an acceleration or velocity signal generated by a suitable transducer. At least a selected frequency band, if not total power of the power spectrum, is compared to a corresponding power band or set of bands of a power spectrum taken from a test tool over a use period thereof. A set of test power spectra may be obtained at several intervals over the use period so that at least selected frequency band power changes can be identified as indicative of tool wear and specific power changes correlated to actual tool wear. Accordingly, the power-frequency comparison yields data which can be used to generate a signal indicating the optimum tool change time which has been previously determined on an empirical basis.

The specific features and advantages of an illustrative method and apparatus for carrying out the method embodied in the invention are described in the following specification. This specification is to be taken with the accompanying drawings of which:

Figure 1:
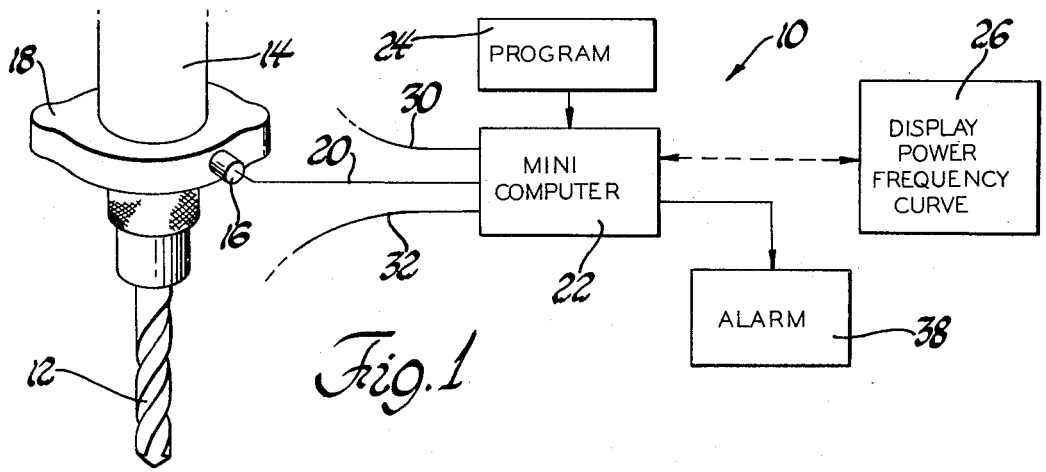
FIG. 1 is a schematic diagram of a test and monitoring arrangement embodying the invention.

Referring now to FIG. 1, there is shown an apparatus 10 for monitoring the wear of a machine tool 12 in the form of a drill bit suitably mounted for operation in a drill press 14. Apparatus 10 comprises a transducer in the form of a small, piezoelectric crystal accelerometer 16 mechanically mounted on a steel collar 18 which is in mechanical contact with the drill bit 12 via a small general-purpose computer 22 which is provided with a suitable program 24 to cause the computer 22 to respond to the vibration signal voltage from accelerometer 16 and, thus, the vibration of tool 12 while in use. During an analysis phase as hereinafter described in greater detail, the computer 22 responds to the vibrational characteristic which is represented by the time varying voltage from accelerometer 16 to produce a power spectrum for comparison to a test spectrum or portion thereof as hereinafter explained. The power spectrum is generated from data supplied by the computer 22 and can be plotted on a two-axis plotter 26 as illustrated in FIG. 1.

In accordance with the invention a tool wear monitoring system is established by first performing an empirical analysis of the change in the power spectrum of the vibrational characteristic of the tool over a use period which preferably extends from a new or sharpened tool to a tool which is worn well past what might be considered a normally usable condition. The analysis phase involves the generation of several vibrational characteristic power spectra, each spectrum being taken at one of several uniformly spaced intervals during the use of the tool 12. At each interval the wear condition of the tool 12 is examined and correlated with the then obtaining power spectrum. Wear condition may be established from actual tool sharpness or from surface finish or some other objective characteristic. Accordingly, the analysis stage results in the production of several frequency-power charts of the type illustrated in FIG. 3, each spectrum or chart being correlated with a wear condition.

The second phase in the establishment of a tool wear monitor, in accordance with the subject invention, is the examination of the various power spectra and the establishment of a tool wear condition at which tool change is optimized as far as production efficiency and qualitative result is concerned. Once this wear condition is established it remains to determine that change or group of changes in the power spectrum which best and most accurately indicate the tool wear. Once this is accomplished, a suitable detector and monitor which is tailored to the power frequency distribution change can be fabricated, examples of which are hereinafter described.

Figure 2:
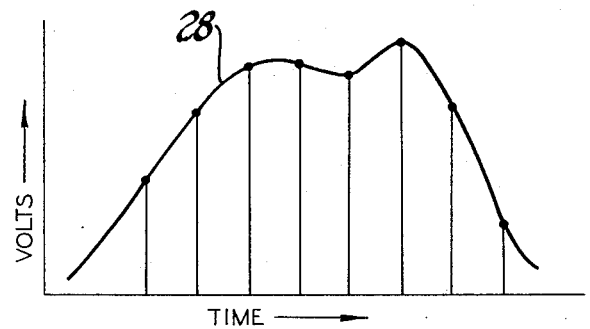
FIG. 2 is a waveform of a digitized signal used in deriving a power-frequency spectrum by Fourier analysis.

FIG. 2 shows a voltage waveform 28 which is produced by the accelerometer 16 during a small time interval of tool use. As previously indicated the accelerometer 16 is preferably a piezoelectric crystal accelerometer having a threaded input element which can be easily engaged with a tapped hole in the collar 18 of drill press 14. A suitable piezoelectric crystal accelerometer is available from Columbia Research Laboratories and identified as model 904. The accelerometer 16 is preferably located on a nonrotating part so that slip rings for signal transfer to external apparatus are not required. Moreover, the accelerometer 16 is located by trial and error at the location which produces the highest signal-to-noise ratio. It will be appreciated that in most cases it will be desirable to mount the accelerometer 16 in intimate mechanical contact with an element which carries the tool; however, it is also possible to mount the transducer on a mechanical element in mechanical contact with the workpiece.

During the analysis step, the accelerometer 16 generates the waveform 28 which, as is well known to those skilled in the art, is a random waveform called a time series. A useful representation of a time series is the power spectrum curve which shows how the variance or power of the time series is distributed with frequency. This power spectrum is derived from the time series by Fourier analysis. The analysis method employed in the preferred embodiment of the invention calculates a line spectrum which is an accurate estimate of the power spectrum.

As illustrated in FIG. 2, the waveform 28 is sampled by the computer 22 at a relatively high rate, this rate being at least twice the frequency of the highest frequency component in the vibration signal waveform as detected by accelerometer 16. Filters may be employed to limit the signal band width. Accordingly, the waveform 28 is digitized by the computer 22 for compatability with the digital data processing methods and apparatus inherent in digital computers. From the digitized acceleration-time signal, the computer 22 performs a Fourier analysis to generate line spectra as illustrated in FIG. 3.

Figure 3:
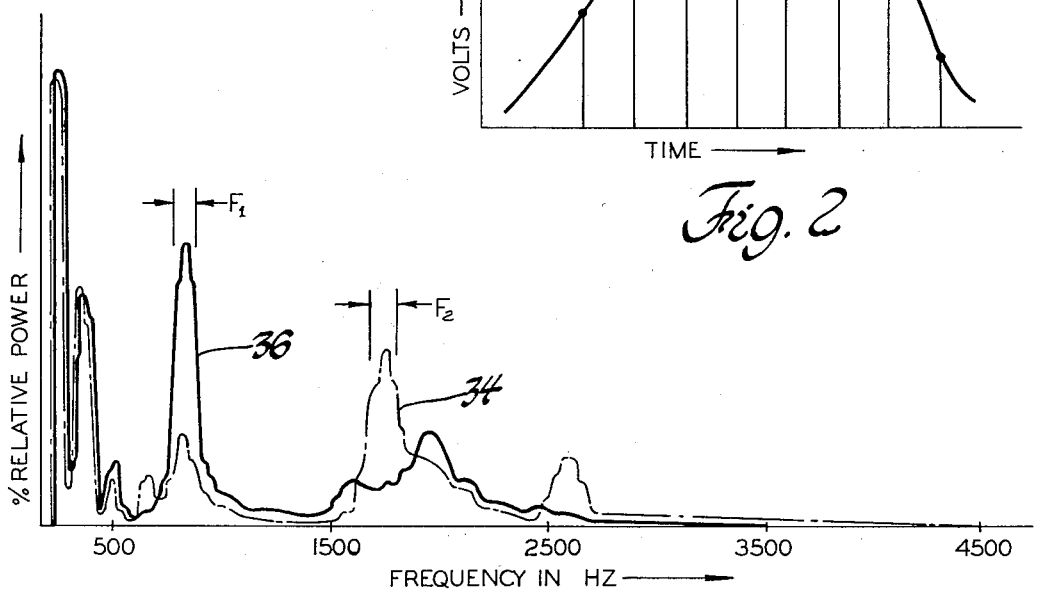
FIG. 3 is an overlay of two power frequency spectra for comparison purposes; and, FIG. 4 is a block diagram of a special-purpose monitor circuit which may be used to detect wear of a tool having a power frequency spectrum of the type illustrated in FIG. 3.

Looking to FIg. 3, a power-frequency spectrum which extends over a total frequency range of 4,400 cps is shown. A power spectrum 34 represents the power-frequency distribution of the vibrational characteristic obtained from a 7/16 inch drill bit in a new, unworn condition. It can be seen that a definite pattern of peaks and valleys is obtained, the highest peaks lying toward the low-frequency end of the scale but with considerable power tending to lie toward the high-frequency end of the scale. FIG. 3 also illustrates a power-frequency spectrum 36 which represents the power distribution of a 7/16 inch drill bit in a worn condition. Spectrum 36 is selected by reference to arbitrary or objective data as corresponding to that tool wear condition at which the surface finished produced are marginally acceptable or at which time the tool is otherwise determined to be in the optimum change condition. It can be seen from FIG. 3 that at least three specific changes in the power frequency distribution are apparent from a comparison of spectra 34 and 36. As a first example, the power in frequency bands F1 and F2 has undergone a marked change; i.e., the power level in frequency band F1 has increased with tool wear and the power level in frequency band F2 has decreased with tool wear. Secondly, the total power over the frequency scale illustrated has decreased by approximately 10 percent. Thirdly, a higher percentage of the power occurs at the lower frequency for the worn drill bit than for the new, unworn drill bit. Accordingly, any or all of these three exemplary power-frequency distribution changes may be employed to indicate that a drill is reaching an estimate wear condition which corresponds with the power frequency distribution characteristics illustrated by waveform 36.

It is to be understood that the power frequency distribution spectra 34 and 36 illustrated in FIG. 3 are merely examples which have been empirically obtained from an analysis process which involves the comparison of a dull and sharp tool.

Referring again to FIG. 1 there is shown an alarm 38 such as a light, bell, buzzer, or other alarm device connected as an output device relative to computer 22. FiG. 1, thus, illustrates the use of computer 22 not only as the analysis monitor but as the actual use monitor to detect the condition of tool bit 12 and to actuate the alarm 38 whenever the power frequency distribution of the Fourier analyzed accelerometer signal corresponds to spectrum 36 of FIG. 3. The computer 22 may be used for such comparison purposes where a large number of individual frequency bands of interest are to be taken into account in satisfactorily fitting a regression model which establishes to a satisfactory degree of accuracy that the tool 12 has reached the optimum change condition. Also illustrated in FIG. 1 are additional cables 30 and 32 which connect the computer 22 to other tools being monitored. Accordingly, the calculating or data processing power level for capacity of computer 22 may be selected so as to be capable of simultaneously monitoring multiple tools in a time shared fashion. A small general-purpose digital computer with at least 4K memory capacity is suitable and such computers are available from several sources.

Figure 4:
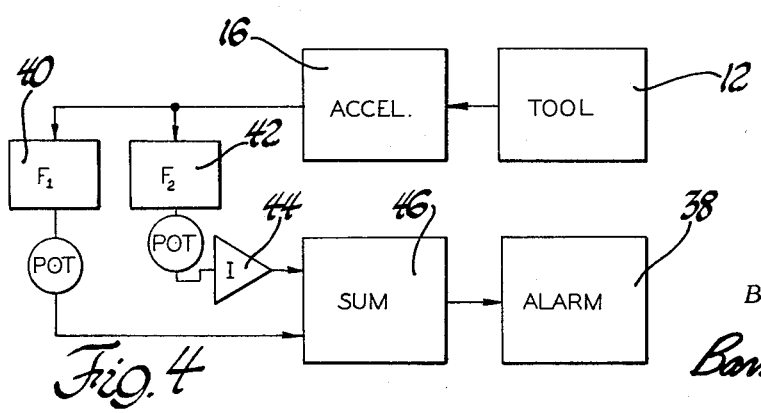

Looking now to FIG. 4, an apparatus is illustrated for monitoring tool wear condition and indicating the optimum tool replacement time by reference only to the power changes in the frequency bands F1 and F2 from FIG. 3. As previously mentioned, the progressive wear of tool 12 results in a dramatic increase of the power level in frequency band F1 and a dramatic decrease in the power level in frequency band F2. To monitor these changes, the mechanically interconnected combination of tool 12 and accelerometer 16 is electrically connected by way of cable 20 to a pair of band pass filters 40 and 42 having high transfer pass bands which correspond at least approximately with frequency ranges F1 and F2, respectively. The output of filter 40 and the inverse of the output of filter 42 are connected as inputs to a two-input summer 46 the output of which is connected to operate an alarm device 38 when a preestablished threshold value is exceeded in the output of the summer. An inverter 44 is connected in series between the output of filter 42 and one of the inputs of summer 46, as shown. Accordingly, the total signal from summer 46 progressively increases in value as the power in the F1 pass band increases and the power in the F2 pass band decreases. The alarm device 36 may have its own built in threshold value of actuation or alternatively a biasing device to establish this threshold may be used. In either event, the alarm 36 is actuated whenever the sum of the power component in the F1 and F2 pass bands is equal to the value represented on the relative scale in FIG. 3 as corresponding to the worn bit spectrum 36. It is desirable to employ potentiometers in series with filters 40 and 42 so that the component amplitudes of the monitored tool signal can be normalized, i.e., adjusted until the new monitored tool signal components exactly equal the new test tool components.

As an alternative to the arrangement in FIG. 4 it is possible where such dramatic power changes in two distinct frequency bands occur to use only one of the filters 40 and 42 along with a simple threshold trigger circuit and an alarm device 38. Alternatively, a total power monitor may be employed to indicate tool change time as a function of a decrease in total power in the accelerometer signal which occurs over the wear period of the tool. As a third but not final alternative, the computer 22, or such other analyzing device as may be suitable, may be used to indicate tool change time whenever a predetermined frequency shift in average power has occurred. As previously described, this shift normally occurs from a higher frequency value to a lower frequency value and a simple averaging value such as RMS value of the power signal may be employed.

In summary, tool wear is monitored and tool change time is indicated in accordance with the invention by first analyzing the change in power frequency distribution which occurs in the vibration acceleration signal produced by a test tool over the life thereof. This step involves the generation of a power-frequency spectrum at each of several spaced intervals and the correlation of these spectra to tool wear condition. Next, an optimum tool replacement condition is determined and the power-frequency distribution corresponding most closely to that condition is identified and used as a standard for future monitoring systems. To build an on-line monitor, the standard is examined and compared to the spectra corresponding to conditions of lesser wear to identify that power-frequency distribution change which most reliably and dramatically indicates wear condition. The monitor system is then designed and assembled. Next, an accelerometer is mechanically connected to a similar tool and tool wear condition is estimated by comparing the power-frequency distribution as measured and normalized to the previously obtained standard and noting when the power-frequency change corresponds with the power-frequency change which has been preestablished as representative of the desired tool change time.

Although several examples of apparatus for accomplishing the invention have been illustrated herein and described in detail, it is to be understood that these examples are illustrative only and are not to be construed in a limiting sense.

The embodiments of the invention in which an exclusive property or privilege is claimed are defined as follows:

1. Apparatus for analyzing the wear characteristics of a machine tool comprising: an accelerometer for producing an output signal representing the vibration characteristic of an element in mechanical contact with the tool, and analyzer means responsive to the signal for providing frequency-power spectrum data of the vibration over a predetermined frequency range.

2. Apparatus as defined in claim 1 wherein said analyzer means comprises a digital computer for sampling said signal at a rate which is high relative to the highest frequency component in said characteristic.

3. Apparatus as defined in claim 2 wherein the computer is programmed to perform a Fourier analysis on the signal over a predetermined number of selected contiguous frequency bands.

4. A method for determining the optimum tool wear condition at which to effect a tool change comprising the steps of: coupling a vibration transducer to the tool, obtaining a first relative power distribution representation over a broad frequency range of vibration measured by the transducer when the tool is in a relatively unworn condition; obtaining a second relative power distribution representation over a broad frequency range of vibration measured by the transducer when the tool is in a relatively worn condition; comparing the first and second power distribution representations to determine those relatively narrow frequency bands in which the largest power changes occur as between the worn and unworn tool conditions; coupling a transducer to at least one additional relatively unworn tool, operating the tool, obtaining a third relative power distribution representation comprising at least the said narrow frequency bands, and changing the tool when the power levels in each of said narrow frequency bands has undergone at least a substantial portion of the total change indicated between the first and second power distribution levels.

* * * * *

UNITED STATES PATENT OFFICE
CERTIFICATE OF CORRECTION

Patent No. 3,694,637                     Dated September 26, 1972

Inventor(s) Allan I. Edwin and Thomas L. Vlach

It is certified that error appears in the above-identified patent and that said Letters Patent are hereby corrected as shown below:

Claim 4, line 13, delete "the largest" and insert therefor --significant--.

Claim 4, line 20, after "undergone" insert --a change which is representative of--.

Signed and sealed this 15th day of January 1974.

(SEAL)
Attest:

EDWARD M. FLETCHER, JR.                RENE D. TEGTMEYER
Attesting Officer                      Acting Commissioner of Patents